United States Patent
Prestwich et al.

(10) Patent No.: US 8,068,799 B1
(45) Date of Patent: Nov. 29, 2011

(54) RADIO FREQUENCY RECEIVER SYSTEMS THAT ARE CONFIGURED TO ACHIEVE HIGH DYNAMIC RANGE

(75) Inventors: Sy Prestwich, Riverton, UT (US); Scott Bevan, Lehi, UT (US)

(73) Assignee: Recon Dynamics, LLC, Kirkland, WA (US)

( * ) Notice: Subject to any disclaimer, the term of this patent is extended or adjusted under 35 U.S.C. 154(b) by 930 days.

(21) Appl. No.: 12/046,239

(22) Filed: Mar. 11, 2008

(51) Int. Cl.
G06F 3/033 (2006.01)
H04B 7/00 (2006.01)

(52) U.S. Cl. .............. 455/130; 455/133; 455/245.1

(58) Field of Classification Search .......... 455/130, 455/323, 293, 245.1, 250.1, 138, 140, 132, 455/133
See application file for complete search history.

(56) References Cited

U.S. PATENT DOCUMENTS

| | | | |
|---|---|---|---|
| 4,652,882 A * | 3/1987 | Shovlin et al. | 342/150 |
| 6,031,478 A * | 2/2000 | Oberhammer et al. | 341/155 |
| 6,289,048 B1 | 9/2001 | Richards et al. | |
| 6,321,073 B1 * | 11/2001 | Luz et al. | 455/239.1 |
| 6,445,732 B1 * | 9/2002 | Beamish et al. | 375/224 |
| 6,670,901 B2 * | 12/2003 | Brueske et al. | 341/139 |
| 6,707,025 B2 | 3/2004 | Azary et al. | |
| 6,862,323 B1 * | 3/2005 | Loper | 375/316 |
| 7,062,001 B2 * | 6/2006 | Lee | 375/347 |
| 7,262,724 B2 * | 8/2007 | Hughes et al. | 341/139 |
| 7,283,797 B1 * | 10/2007 | Freed | 455/245.1 |
| 7,440,525 B2 * | 10/2008 | Moughabghab et al. | 375/345 |
| 7,672,359 B2 * | 3/2010 | Cleary et al. | 375/147 |
| 2003/0222206 A1 | 12/2003 | Azary et al. | |

* cited by examiner

*Primary Examiner* — Sonny Trinh
(74) *Attorney, Agent, or Firm* — Michael J. Donohue; Davis Wright Tremaine LLP

(57) ABSTRACT

A radio frequency (RF) receiver system that is configured to achieve high dynamic range may include at least one antenna and a plurality of receivers connected to the at least one antenna. The plurality of antennas may be configured to provide different gains. The RF receiver system may include an analog-to-digital (A/D) converter subsystem connected to the plurality of receivers. The A/D converter subsystem may include a plurality of A/D converters. An overall digitization range of the A/D converter subsystem may be greater than a digitization range of any of the plurality of A/D converters individually. The overall digitization range of the A/D converter subsystem may be sufficiently large so as to accommodate a desired dynamic range of the RF receiver system.

21 Claims, 5 Drawing Sheets

RADIO FREQUENCY RECEIVER SYSTEMS THAT ARE CONFIGURED TO ACHIEVE HIGH DYNAMIC RANGE

TECHNICAL FIELD

The present disclosure relates generally to radio frequency (RF) communication systems. More specifically, the present disclosure relates to RF receiver systems that are configured to achieve high dynamic range.

BACKGROUND

Radio frequency (RF) communication systems are widely used in today's society. Indeed, RF communication systems are used in many aspects of business, industry and academic endeavors. Some well-known examples of RF communication systems include cellular telephone systems, wireless computer networks (e.g., 802.11), short-range point-to-point communication systems (e.g., RF identification tags), wireless sensor networks (e.g., ZigBee), personal area networks (e.g., Bluetooth, Ultra-wideband), and so forth. Technology related to RF communication systems continues to advance at a rapid pace.

RF communication systems facilitate the transmission of information from a transmitter to a receiver over a communication channel. The transmitter modulates an information-bearing signal onto a carrier frequency, and the modulated signal is then radiated by an antenna. The receiver isolates the desired signal from interference and noise for demodulation and further processing. RF communication systems may be utilized to transmit many different kinds of information, such as audio and/or video signals.

As indicated above, the present disclosure relates to the dynamic range of a receiver within an RF communication system. The dynamic range of a receiver is a measure of the highest- and lowest-level signals that can be accommodated by the receiver. Stated another way, a receiver's dynamic range refers to the range of signal levels over which the receiver is able to operate. Dynamic range may be defined as the difference in power between the weakest signal that may be detected by the receiver and the strongest signal that may be handled by the receiver. The lower end of a receiver's dynamic range may be limited by noise that masks low-level signals. The upper end of a receiver's dynamic range may be limited by interference due to non-linearities in the receiver that introduce distortion products in the received signal or that distort the desired signal.

DETAILED DESCRIPTION

Figure 1:
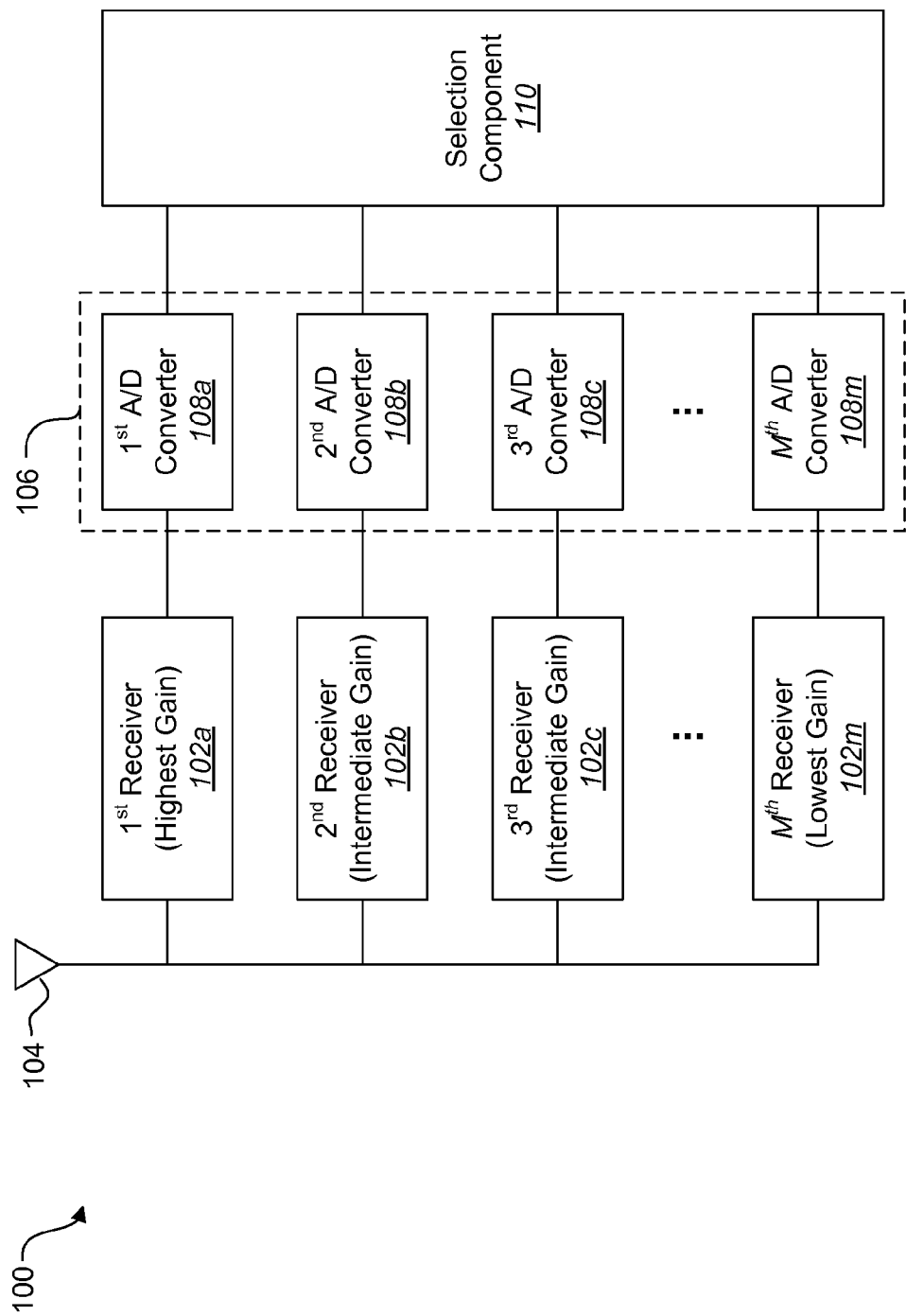
FIG. 1 illustrates an embodiment of an RF receiver system that may be able to achieve high dynamic range.

A radio frequency (RF) receiver system that is configured to achieve high dynamic range is disclosed. The RF receiver system may include at least one antenna. The RF receiver system may also include a plurality of receivers connected to the at least one antenna. The plurality of receivers may be configured to provide different gains. The RF receiver system may also include an analog-to-digital (A/D) converter subsystem connected to the plurality of receivers. The A/D converter subsystem may include a plurality of A/D converters. An overall digitization range of the A/D converter subsystem may be greater than a digitization range of any of the plurality of A/D converters individually. The overall digitization range of the A/D converter subsystem may be sufficiently large so as to accommodate a desired overall dynamic range of the RF receiver system.

The plurality of receivers may also be configured to provide different noise figures and different linearities in addition to different gains. The different gains of the plurality of receivers may be selected so that any signal that is within the desired dynamic range of the RF receiver system is detected by and within a linear (instantaneous) range of at least one of the plurality of receivers.

The digitization ranges of the plurality of A/D converters may overlap. The overlap of the digitization ranges may be sufficient to completely contain a desired instantaneous dynamic range of the RF receiver system. The desired instantaneous dynamic range may correspond to a minimum desired signal-to-noise ratio for demodulating a received signal.

The RF receiver system may be configured so that it does not implement automatic gain control. The RF receiver system may include an equal number of receivers and A/D converters. Each of the plurality of receivers may have one of the plurality of A/D converters connected thereto.

The RF receiver system may include M receivers. The value of M may depend on a desired overall and instantaneous dynamic range of the RF receiver system.

Each of the plurality of A/D converters may have a digitization range that may achieve the desired instantaneous dynamic range but that may not achieve the desired overall dynamic range of the RF receiver system. Each of the plurality of A/D converters may achieve a sample rate that corresponds to a radio bandwidth.

Each of the plurality of A/D converters may have the same digitization range. Alternatively, the plurality of A/D converters may have different digitization ranges.

The plurality of receivers may include a highest gain receiver whose gain corresponds to a lower level of the desired dynamic range of the RF receiver system. The plurality of receivers may also include a lowest gain receiver whose gain corresponds to an upper level of the desired dynamic range of the RF receiver system. The plurality of receivers may also include at least one intermediate gain receiver whose gain is less than the gain provided by the highest gain receiver and is greater than the gain provided by the lowest gain receiver.

The RF receiver system may also include a selection component that is connected to the A/D converter subsystem. The selection component may select an output signal from one of the plurality of A/D converters for additional processing.

For each new sample of a received signal the selection component may be configured to select a highest gain receiver A/D converter to be a currently selected A/D converter and determine whether the currently selected A/D converter is saturated or near saturation. If it is determined that the currently selected A/D converter is saturated or near saturation, the selection component may select a next lowest gain receiver A/D converter as the currently selected A/D converter and re-determine whether the currently selected A/D converter is saturated or near saturation. If it is determined that the currently selected A/D converter is not saturated or near saturation, the selection component may select the output signal from the currently selected A/D converter for additional processing.

Alternatively, for each new sample of a received signal the selection component may be configured to select a lowest gain receiver A/D converter to be a currently selected A/D converter and to determine whether the currently selected A/D converter is saturated or near saturation. If it is determined that the currently selected A/D converter is not saturated or near saturation, the selection component may select a next highest gain receiver A/D converter as the currently selected A/D converter and re-determine whether the currently selected A/D converter is saturated or near saturation. If it is determined that the currently selected A/D converter is saturated or near saturation, the selection component may be configured to select a next lowest gain receiver A/D converter as the currently selected A/D converter and then select the output signal from the currently selected A/D converter for additional processing.

A radio frequency (RF) receiver system that is configured to achieve high dynamic range is also disclosed. The RF receiver system may include means for receiving RF signals that are within a desired dynamic range of the RF receiver system. The RF receiver system may also include means for converting any received signal that is within the desired dynamic range of the RF receiver system from an analog representation into a digital representation. The RF receiver system may be configured so that it does not implement automatic gain control. The RF receiver system may be configured so that it does not comprise an analog-to-digital (A/D) converter that has a digitization range that is able to accommodate the desired instantaneous dynamic range of the RF receiver system at a sample rate at which the RF receiver system is configured to operate.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As indicated above, the present disclosure relates to the dynamic range of an RF receiver, which is a measure of the highest- and lowest-level signals that can be accommodated by the receiver. Although physical limitations of components may affect the dynamic range of an RF receiver, various design techniques have been developed which can improve dynamic range. Consequently, many known RF receivers are able to achieve high dynamic range.

The output of an RF receiver may be provided to an analog-to-digital (A/D) converter, which is an electronic circuit that converts an input analog signal to a digital signal. The dynamic range that may be achieved by known A/D converters is not as great as the dynamic range that may be achieved by known RF receivers. This is particularly the case where the A/D converter is operating at a high sample rate (e.g., at least 20 MHz). Thus, in order to achieve high dynamic range, RF receiver systems may include some mechanism for addressing the disparity between the relatively high dynamic range of an RF receiver (overall dynamic range) and the relatively low dynamic range of an A/D converter.

Many RF receiver systems include an automatic gain control (AGC) subsystem. As used herein, the term "AGC subsystem" refers to any subsystem that changes the gain of a variable gain element based on a power detector output.

An AGC system adjusts the level of the signal output by the RF receiver to be within the dynamic range of the A/D converter. Having an AGC subsystem that operates in this manner may be satisfactory for a number of applications. However, adjusting gain takes time, and for some applications the amount of time that is spent adjusting gain may be quite costly in terms of overall system performance.

Several exemplary embodiments are now described with reference to the Figures. This detailed description of several exemplary embodiments, as illustrated in the Figures, is not intended to limit the scope of the claims.

FIG. 1 illustrates an embodiment of an RF receiver system 100 that may be able to achieve high dynamic range without the use of an AGC subsystem. The RF receiver system 100 includes multiple RF receivers 102. A first RF receiver 102a, a second RF receiver 102b, a third receiver 102c, and an $M^{th}$ receiver 102m are shown in FIG. 1. Each of the RF receivers 102 is connected to an antenna 104.

The different RF receivers 102 in the system 100 may be configured to achieve different amounts of gain. The different RF receivers 102 may also differ with respect to other parameters, such as noise figure and linearity. A high gain receiver typically has a better noise figure and worse linearity with large signals than a low gain receiver. (In this context, the term "noise figure" refers to a measure of the degradation of the signal, caused by components in the receiver.) Conversely, a lower gain receiver typically has better linearity but a worse noise figure with large signals than a high gain receiver.

The gains provided by the various receivers 102 may be selected so as to implement a desired dynamic range for the RF receiver system 100. Stated another way, the gains of the receivers 102 may be selected so that any input signal that is within a desired dynamic range of the RF receiver system 100 may be detected by and within a linear (instantaneous) range of at least one of the RF receivers 102.

In the system 100 that is shown in FIG. 1, the first receiver 102a may be configured to achieve an amount of gain that corresponds to the lower level of the desired dynamic range for the RF receiver system 100. Thus, the first receiver 102a may sometimes be referred to herein as the highest gain and lowest noise figure receiver 102a in the system 100, optimized to receive the smallest signals arriving at the antenna 104. The $M^{th}$ receiver 102m in the system 100 may be configured to achieve an amount of gain that corresponds to the upper level of the desired dynamic range for the RF receiver system 100. Thus, the $M^{th}$ receiver 102m may sometimes be referred to herein as the lowest gain and highest linearity receiver 102m in the system 100, optimized to receive the largest signals arriving at the antenna. The second and third receivers 102b, 102c may be configured to achieve an amount of gain that is less than the gain achieved by the highest gain receiver 102a, but that is greater than the gain achieved by the lowest gain receiver 102m. Thus, the second and third receivers 102b, 102c may sometimes be referred to herein as intermediate gain receivers 102b, 102c.

The RF receiver system 100 may also include an A/D converter subsystem 106 that includes multiple A/D converters 108. The RF receiver system 100 may be configured so that for each receiver 102 in the system 100, a separate A/D converter 108 is provided. Thus, the RF receiver system 100 may include an equal number of receivers 102 and A/D converters 108. A first A/D converter 108a, a second A/D converter 108b, a third A/D converter 108c, and an $M^{th}$ A/D converter 108m are shown in FIG. 1. The A/D converters 108 may be connected to the receivers 102 so that each of the receivers 102 has one of the A/D converters 108 connected thereto. In particular, the first A/D converter 108a may be connected to the first receiver 102a, the second A/D converter 108b may be connected to the second receiver 102b, the third A/D converter 108c may be connected to the third receiver 102c, and the $M^{th}$ A/D converter 108d may be connected to the $M^{th}$ receiver 102m.

Each A/D converter 108 in the RF receiver system 100 may be configured to achieve a sample rate that corresponds to a radio bandwidth, i.e., that adequately digitizes the signals received by the RF receiver system 100. The sample rate may be at least 20 MHz to be high enough to digitize a typical radio band of tens of MHz. When operating at a sample rate of at least 20 MHz, the digitization range of each A/D converter 108 may be less than the desired dynamic range of the RF receiver system 100. (The "digitization range" of an A/D converter 108 may be a measure of the number of discrete values that it can produce over a given range of input values. The digitization range of an A/D converter 108 may sometimes be referred to as the dynamic range of the A/D converter 108.)

As mentioned above, the different receivers 102 in the system 100 may be configured to provide different amounts of gain. By connecting the A/D converters 108 to the receivers 102 as shown, and by selecting the different gains provided by the receivers 102 in a certain way, the overall digitization range of the A/D converter subsystem 106 (i.e., the digitization range of the A/D converter subsystem 106 as a whole) may be greater than the digitization range of any of the A/D converters 108 individually. Moreover, the overall digitization range of the A/D converter subsystem 106 may be at least as great as the desired dynamic range of the RF receiver system 100.

Advantageously, the RF receiver system 100 that is shown in FIG. 1 does not include an automatic gain control subsystem. Thus, the depicted RF receiver system 100 may be able to achieve high dynamic range without implementing automatic gain control.

The RF receiver system 100 may also include a selection component 110. The selection component 110 is connected to the A/D converters 108. The selection component 110 selects an output signal from one of the A/D converters 108 for additional processing. The operation of the selection component 110 will be described in greater detail below.

Figure 2:
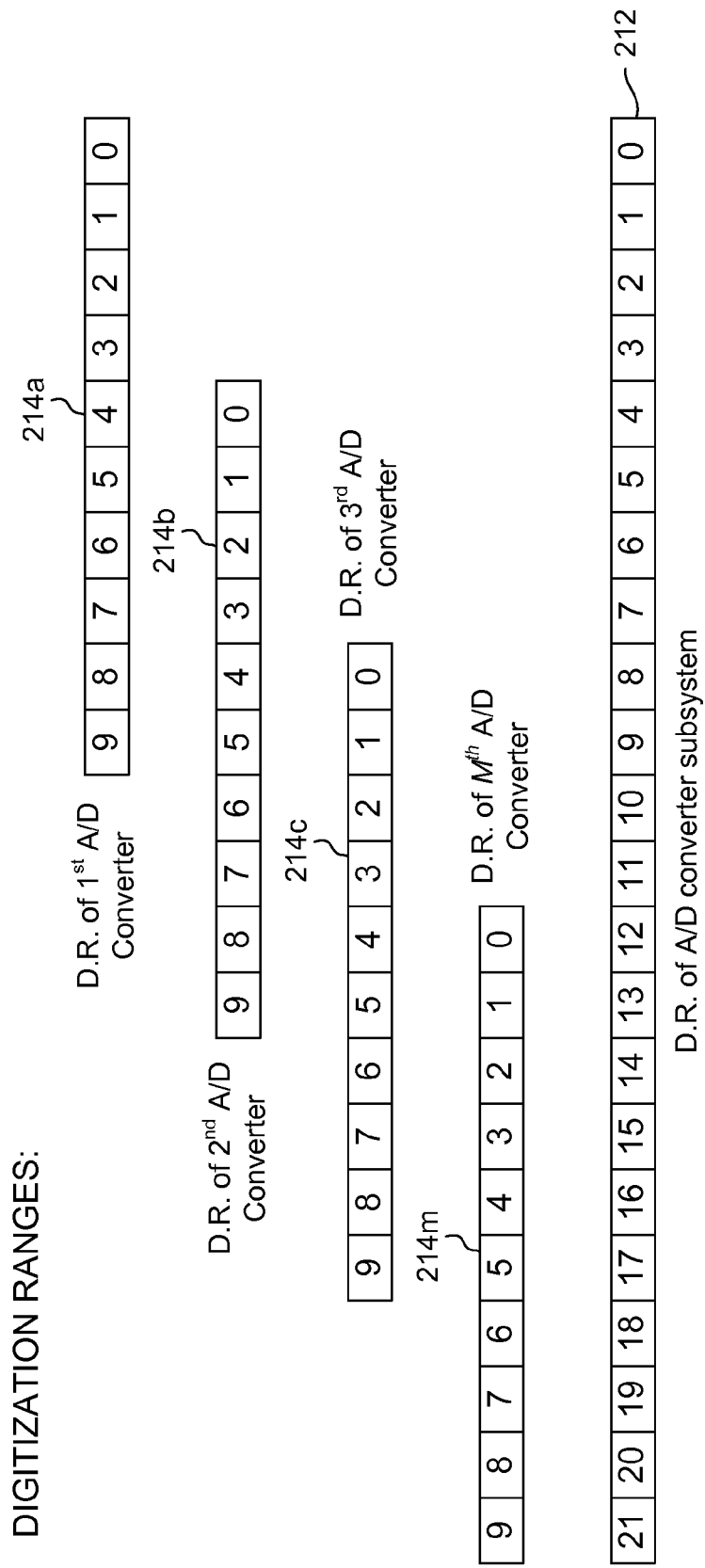
FIG. 2 illustrates an example showing how the RF receiver system of FIG. 1 may be configured.

FIG. 2 illustrates an example showing how the RF receiver system 100 of FIG. 1 may be configured so that the overall digitization range 212 of the A/D converter subsystem 106 is at least as great as the desired dynamic range of the RF receiver system 100. In addition to the exemplary overall digitization range 212 of the A/D converter subsystem 106, exemplary digitization ranges 214 of each of the A/D converters 108 in the RF receiver system 100 are also shown in FIG. 2. In particular, FIG. 2 shows an exemplary digitization range 214a of the first A/D converter 108a, an exemplary digitization range 214b of the second A/D converter 108b, an exemplary digitization range 214c of the third A/D converter 108c, and an exemplary digitization range 214m of the $M^{th}$ A/D converter 108m.

As indicated above, in the depicted RF receiver system 100 the first A/D converter 108a may be connected to the first receiver 102a, which has the highest gain of the receivers 102 in the system 100. The digitization range 214a of the first A/D converter 108a corresponds to the least significant bits of the overall digitization range 212 of the A/D converter subsystem 106.

The $M^{th}$ A/D converter 108m may be connected to the $M^{th}$ receiver 102m, which has the lowest gain of the receivers 102 in the system 100. The digitization range 214m of the $M^{th}$ A/D converter 108m corresponds to the most significant bits of the overall digitization range 212 of the A/D converter subsystem 106.

In the depicted example, it will be assumed that M=4, i.e., that there are four receivers 102 in the RF receiver system 100. It will also be assumed that the desired dynamic range of the RF receiver system 100 is around 130 dB, which corresponds to a digitization range of approximately 22 bits. Presently, there is not a commercially available A/D converter that is capable of providing a digitization range of 22 bits and that is also capable of achieving high sample rates. However, A/D converters that have a 10-bit digitization range and that are capable of achieving high sample rates are commercially available. Thus, it will also be assumed that each A/D converter 108 in the RF receiver system 100 provides a digitization range of 10 bits while achieving a high sample rate (e.g., at least 20 MHz).

To achieve an overall digitization range 212 that is greater than any of the A/D converters' individual digitization ranges 214, the RF receiver system 100 may be configured so that the digitization ranges 214 of the different A/D converters 108 overlap. This is shown in FIG. 2. In the depicted example, the digitization ranges 214 of the A/D converters 108 overlap by six bits. This may be accomplished by selecting the gains of the different receivers 102 so that if the first receiver 102a provides a gain of 100 dB, the second receiver 102b provides a gain of 76 dB, the third receiver 102c provides a gain of 52 dB, and the $M^{th}$ receiver 102m provides a gain of 28 dB.

As indicated above, however, the configuration that is shown in FIG. 2 is exemplary only. In alternative configurations of the RF receiver system 100 the digitization ranges 214 of the A/D converters 108 may overlap by more than six bits, or by fewer than six bits. The extent to which the digitization ranges 214 of the different A/D converters 108 overlap may depend on a factor that will be referred to herein as the "desired instantaneous dynamic range" of the system 100.

The desired instantaneous dynamic range of the RF receiver system 100 may be related to the desired performance of the RF receiver system 100. The desired instantaneous dynamic range may correspond to the minimum desired signal-to-noise ratio for demodulating a received signal. The desired instantaneous dynamic range may also reflect the reality that it typically is not possible to simultaneously use bits from the outputs of different A/D converters 108, because of non-linearities associated with the differences in gain between the different receivers 102. Thus, the selection component 110 in the RF receiver system 100 may be configured to select an output signal from exactly one of the A/D converters 108 for further processing, rather than trying to combine different bits from different output signals.

The RF receiver system 100 may be configured so that the digitization ranges 214 of the A/D converters 108 overlap to an extent that is sufficient to completely contain the desired instantaneous dynamic range of the RF receiver system 100. For example, if the desired instantaneous dynamic range of the RF receiver system 100 is around 12 dB, which corresponds to approximately two bits, then the system 100 may be designed so that the digitization ranges 214 of the A/D converters 108 overlap by at least two or three bits. The receiver A/D converters 108 may be configured to be "phase aligned". The outputs from each receiver A/D converter need to produce approximately the same phase for a given input signal. This may be accomplished using delay-line techniques or by using a FIFO (First In, First Out) queue on the A/D samples to select the correct sample that is time-aligned with the samples from the other receiver A/D converters 108.

The desired instantaneous dynamic range for the RF receiver system 100 may depend on how the RF receiver system 100 is being used. For example, if the RF receiver system 100 is being used in a mobile phone where the level of performance is not extremely high, the desired instantaneous dynamic range may be around 12 dB, which corresponds to around two or three bits. As indicated above, in this case the RF receiver system 100 may be configured so that the digitization ranges 214 of the A/D converters 108 overlap by at least two or three bits. However, if the RF receiver system 100 is being used in a video system where a much higher level of performance is desired, the desired instantaneous dynamic range may be around 40 dB, which corresponds to around five or six bits. In this case, the RF receiver system 100 may be configured so that the digitization ranges 214 of the A/D converters 108 overlap by at least five or six bits.

In the example that is shown in FIG. 2, it is assumed that each of the A/D converters 108 in the RF receiver system 100 has the same digitization range 214 (i.e., 10 bits). However, the RF receiver system 100 may be configured so that different A/D converters 108 have different digitization ranges.

The number of receivers 102 that are utilized in the RF receiver system 100 may depend on the desired instantaneous dynamic range of the RF receiver system 100. In the specific example that is shown in FIG. 2, four receivers 102 are utilized to achieve an overall digitization range of 22 bits (which, as indicated above, corresponds to a dynamic range of around 130 dB) where each A/D converter has a digitization range of 10 bits and the desired instantaneous dynamic range is 6 bits. However, if the desired instantaneous dynamic range of the RF receiver system 100 were less than 6 bits, it may be possible for fewer than 4 receivers 102 to be utilized to achieve an overall digitization range 212 of (at least) 22 bits. Conversely, if the desired instantaneous dynamic range of the RF receiver system 100 were greater than 6 bits, more than 4 receivers 102 may be utilized to achieve an overall digitization range 212 of 22 bits.

Figure 3:
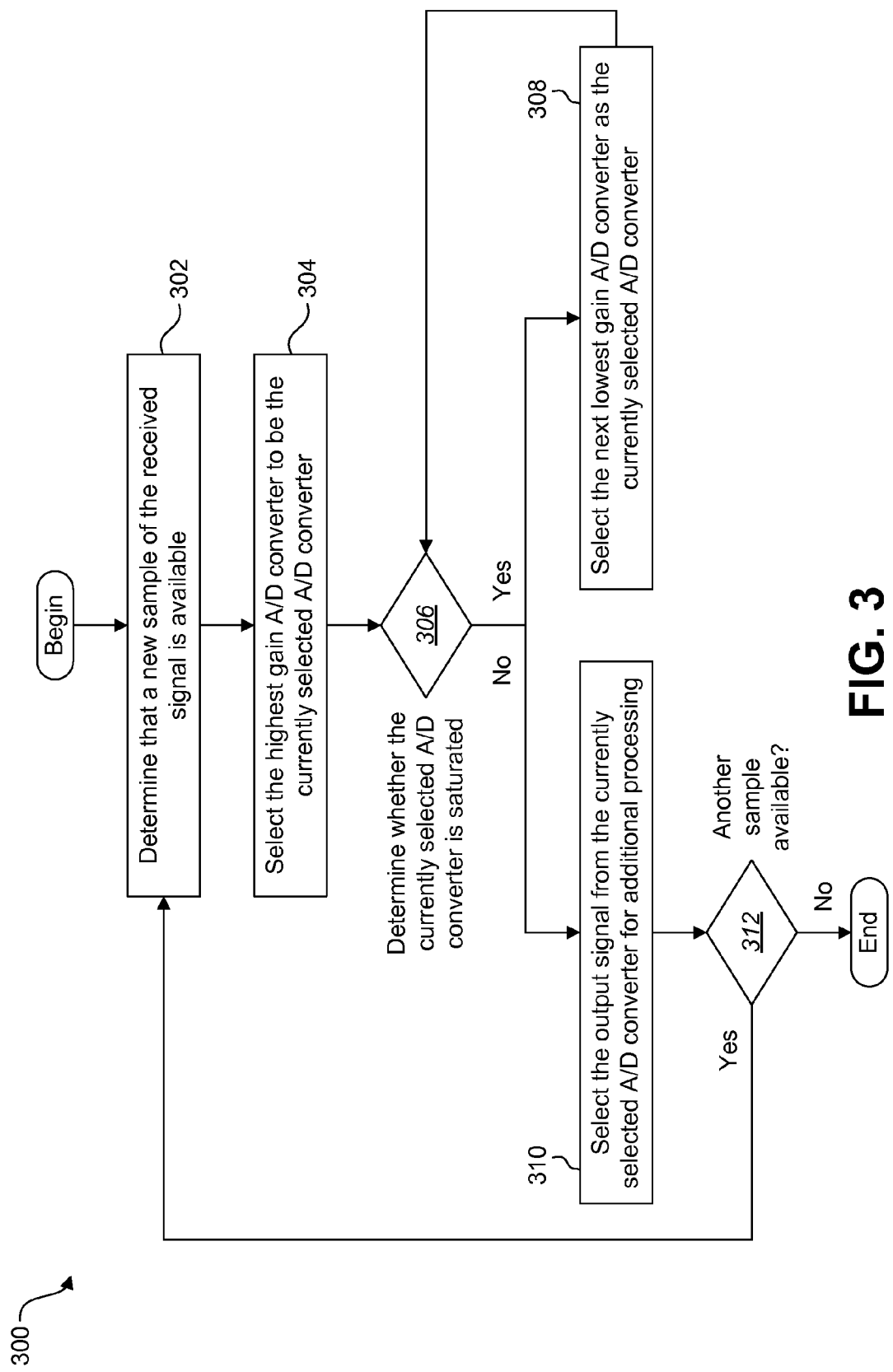
FIG. 3 illustrates an exemplary method that may be implemented by the selection component in the RF receiver system of FIG. 1.

As discussed above, the selection component 110 selects an output signal from one of the A/D converters 108 for additional processing. FIG. 3 illustrates an exemplary method 300 for determining which of the output signals is selected. The method 300 may be implemented by the selection component 110.

As used herein, the phrase "highest gain A/D converter" may refer to the A/D converter 108 that is connected to the receiver 102 having the highest gain relative to the other receivers 102 in the RF receiver system 100. For instance, in the example that is shown in FIG. 2, the first A/D converter 108a may be the highest gain A/D converter 108a.

The phrase "currently selected A/D converter" may refer to the A/D converter 108 whose output is currently selected for processing by the selection component 110. The phrase "next lowest gain A/D converter" may refer to the A/D converter 108 that is connected to the receiver 102 having the next lowest gain relative to the receiver 102 that is connected to the currently selected A/D converter 108. For instance, referring again to the example that is shown in FIG. 2, if the first A/D converter 108a is the currently selected A/D converter 108, then the second A/D converter 108b may be the next lowest gain A/D converter 108b.

The depicted method 300 may be implemented as a signal is being received and processed by the RF receiver system 100. In accordance with the method 300, when it is determined 302 that a new sample of the received signal is available from the A/D converters 108, the highest gain A/D converter 108 may be selected 304 to be the currently selected A/D converter 108.

A determination may then be made 306 about whether the currently selected A/D converter 108 is saturated or is near saturation. If it is determined 306 that the currently selected A/D converter 108 is saturated or is near saturation, then the next lowest gain A/D converter 108 may be selected to be the currently selected A/D converter 108. Then another determination may be made 306 about whether the currently selected A/D converter 108 is saturated or near saturation. These steps 306, 308 may be repeated until it is determined 306 that the currently selected A/D converter is not saturated or near saturation. When it is determined 306 that the currently selected A/D converter is not saturated or near saturation, the output signal from the currently selected A/D converter 108 may be selected 310 for additional processing.

The method 300 may then involve determining 312 whether an additional sample is available for processing. If so, the method 300 may return to step 302 and proceed as described above. If not, the method 300 may end.

Figure 4:
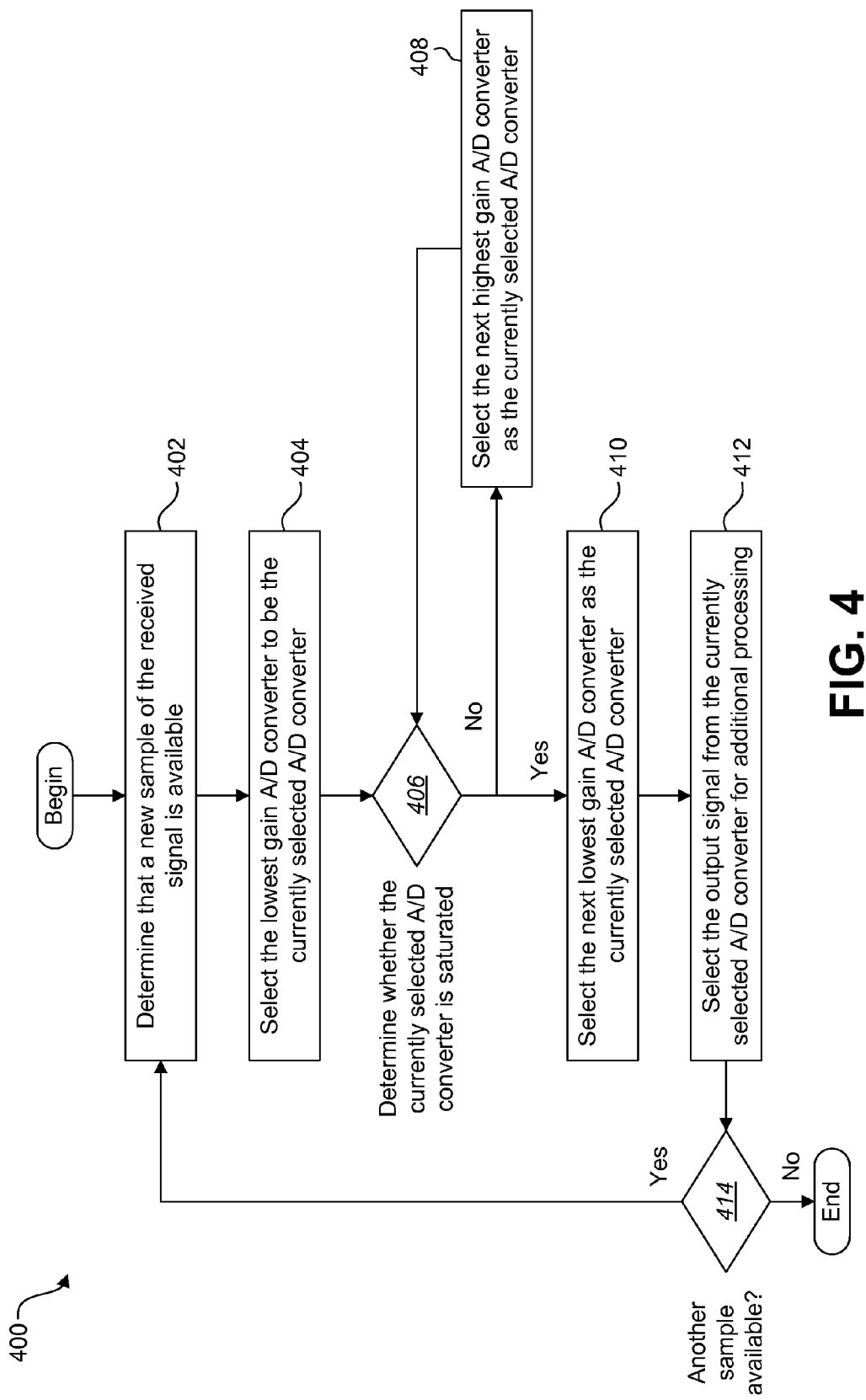
FIG. 4 illustrates another exemplary method that may be implemented by the selection component in the RF receiver system of FIG. 1.

FIG. 4 illustrates another exemplary method 400 for determining which of the output signals of the A/D converters 108 is selected. As before, the method 400 may be implemented by the selection component 110.

As used herein, the phrase "lowest gain A/D converter" may refer to the A/D converter 108 that is connected to the receiver 102 having the lowest gain relative to the other receivers 102 in the RF receiver system 100. For instance, in the example that is shown in FIG. 2, the $M^{th}$ A/D converter 108m may be the lowest gain A/D converter 108m.

The phrase "next highest gain A/D converter" may refer to the A/D converter 108 that is connected to the receiver 102 having the next highest gain relative to the receiver 102 that is connected to the currently selected A/D converter 108. For instance, referring again to the example that is shown in FIG. 2, if the $M^{th}$ A/D converter 108m is the currently selected A/D converter 108, then the third A/D converter 108c may be the next highest gain A/D converter 108c.

As discussed above, the phrase "currently selected A/D converter" may refer to the A/D converter 108 whose output is currently selected for processing by the selection component 110. Also as discussed above, the phrase "next lowest gain A/D converter" may refer to the A/D converter 108 that is connected to the receiver 102 having the next lowest gain relative to the receiver 102 that is connected to the currently selected A/D converter 108.

Like the method 300 shown in FIG. 3, the method 400 shown in FIG. 4 may be implemented as a signal is being received and processed by the RF receiver system 100. In accordance with the method 400, when it is determined 402 that a new sample of the received signal is available from the A/D converters 108, the lowest gain A/D converter 108 may be selected 404 to be the currently selected A/D converter 108.

A determination may then be made 406 about whether the currently selected A/D converter 108 is saturated or near saturation. If it is determined 406 that the currently selected A/D converter 108 is not saturated or near saturation, then the next highest gain A/D converter 108 may be selected 408 to be the currently selected A/D converter 108. Then another determination may be made 406 about whether the currently selected A/D converter 108 is saturated. These steps 406, 408 may be repeated until it is determined 406 that the currently selected A/D converter 108 is saturated. When it is determined 406 that the currently selected A/D converter 108 is saturated, the next lowest gain A/D converter 108 may be selected 410 as the currently selected A/D converter 108, and the output signal from the currently selected A/D converter 108 may be selected 412 for additional processing.

The method 400 may then involve determining 402 whether an additional sample is available for processing from the A/D converters 108. If so, the method 400 may return to step 402 and proceed as described above. If not, the method 400 may end.

The methods 300, 400 shown in FIGS. 3 and 4 for determining which of the output signals of the A/D converters 108 is selected are exemplary only. Other methods may be used.

For example, the selection component 110 may a-priori know which receiver 102 and A/D converter 108 to use and select it directly based on comparing the outputs from the A/D converters 108 and using an output from an A/D converter 108 that is known to be within the digitization range (dynamic range) of the A/D converter 108. Under some circumstances, multiple outputs from multiple A/D converters 108 may be used.

As another alternative, the selection component 110 may be configured so that it only selects a different A/D converter 108 if the signal is not within the digitization range (dynamic range) of the A/D converter 108 within a defined tolerance. This may be done instead of, or possibly in addition to, checking for saturation of the A/D converter 108.

Figure 5:
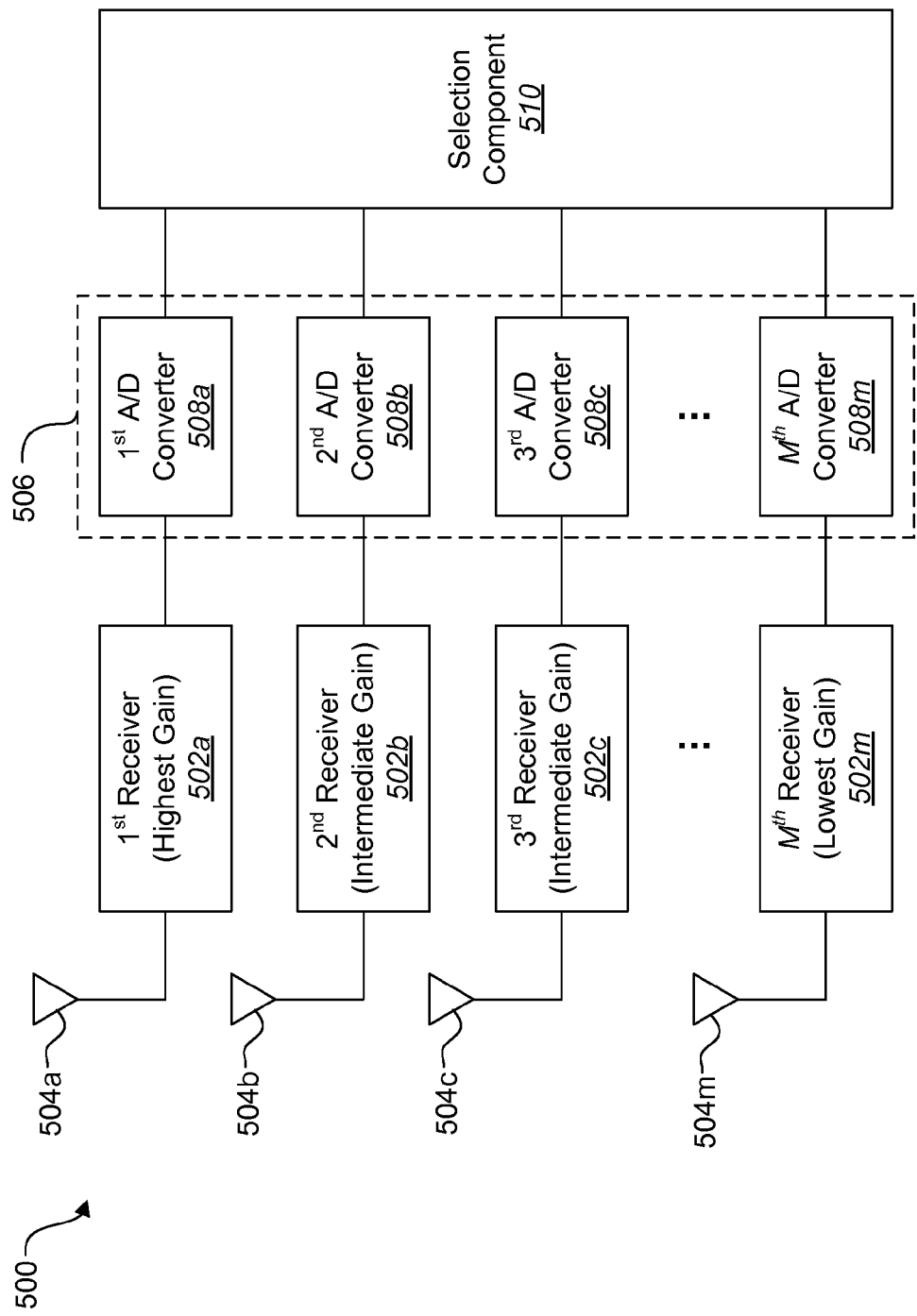
FIG. 5 illustrates another embodiment of an RF receiver system that may be able to achieve high dynamic range.

FIG. 5 illustrates another embodiment of an RF receiver system 500 that is able to achieve high dynamic gain without the use of an AGC subsystem. There are several components in the RF receiver system 500 of FIG. 5 that operate similarly to components that were described above in connection with the RF receiver system 100 that is shown in FIG. 1. These components include the receivers 502a, 502b, 502c, 502m, the A/D converter subsystem 506 which includes multiple A/D converters 508a, 508b, 508c, 508m, and the selection component 510.

In the RF receiver system 100 of FIG. 1, each receiver 102 is connected to the same antenna 104. In contrast, in the RF receiver system 500 shown in FIG. 5 each receiver 502 is connected to a different antenna 504. Thus, a first antenna 504a is connected to the first receiver 502a, a second antenna 504b is connected to the second receiver 502b, a third antenna 504c is connected to the third receiver 504c, and an $M^{th}$ antenna 504m is connected to the $M^{th}$ receiver 502m.

The RF receiver systems 100, 500 described herein may be used in a wide variety of systems. Some exemplary systems in which these RF receiver systems 100, 500 may be used are described in U.S. patent application Ser. No. 11/140,081, titled "Burst Spread Spectrum Radio System and Method for Asset Tracking and Data Telemetry," filed May 27, 2005, with inventors Sy Prestwich, Scott Bevan, Dirk Ostermiller, and K. Deric Eldredge (hereinafter, "the '181 application"). The '181 application is assigned to the assignee of the present application, and is hereby incorporated by reference in its entirety.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A radio frequency (RF) receiver system that is configured to achieve high dynamic range, comprising:
   at least one antenna;
   a plurality of receivers connected to the at least one antenna, wherein the plurality of receivers are configured to provide different gains; and
   an analog-to-digital (A/D) converter subsystem connected to the plurality of receivers, wherein the A/D converter subsystem comprises a plurality of A/D converters, wherein an overall digitization range of the A/D converter subsystem is greater than a digitization range of any of the plurality of A/D converters individually, and wherein the overall digitization range of the A/D converter subsystem is sufficiently large so as to accommodate a desired dynamic range of the RF receiver system, and wherein digitization ranges of the plurality of A/D converters overlap.

2. The RF receiver system of claim 1, wherein the plurality of receivers are also configured to provide different noise figures and different linearities.

3. The RF receiver system of claim 1, wherein the RF receiver system does not implement automatic gain control.

4. The RF receiver system of claim 1, wherein the overlap of the digitization ranges is sufficient to completely contain a desired instantaneous dynamic range of the RF receiver system.

5. The RF receiver system of claim 4, wherein the desired instantaneous dynamic range corresponds to a minimum desired signal-to-noise ratio for demodulating a received signal.

6. The RF receiver system of claim 1, wherein the RF receiver system comprises an equal number of receivers and A/D converters, and wherein each of the plurality of receivers has one of the plurality of A/D converters connected thereto.

7. The RF receiver system of claim 1, wherein the RF receiver system comprises M receivers, and wherein M depends on a desired instantaneous dynamic range of the RF receiver system.

8. The RF receiver system of claim 1, wherein each of the plurality of A/D converters has a digitization range that is less than the desired dynamic range of the RF receiver system.

9. The RF receiver system of claim 1, further comprising a selection component that is connected to the A/D converter subsystem, wherein the selection component selects an output signal from one of the plurality of A/D converters for additional processing.

10. The RF receiver system of claim 1, wherein each of the plurality of A/D converters has the same digitization range.

11. The RF receiver system of claim 1, wherein the plurality of A/D converters have different digitization ranges.

12. The RF receiver system of claim 1, wherein each of the plurality of A/D converters achieves a sample rate that corresponds to a radio bandwidth.

13. The RF receiver system of claim 1, wherein the at least one antenna is a single antenna.

14. The RF receiver system of claim 1, wherein the at least one antenna is a plurality of antennas, and wherein each receiver is connected to a different antenna.

15. A radio frequency (RF) receiver system that is configured to achieve high dynamic range, comprising:
    at least one antenna;
    a plurality of receivers connected to the at least one antenna, wherein the plurality of receivers are configured to provide different gains; and
    an analog-to-digital (A/D) converter subsystem connected to the plurality of receivers, wherein the A/D converter subsystem comprises a plurality of A/D converters, wherein an overall digitization range of the A/D converter subsystem is greater than a digitization range of any of the plurality of A/D converters individually, and wherein the overall digitization range of the A/D converter subsystem is sufficiently large so as to accommodate a desired dynamic range of the RF receiver system, and wherein the different gains of the plurality of receivers are selected so that any signal that is within the desired dynamic range of the RF receiver system is detected by and within a linear range of at least one of the plurality of A/D converters.

16. A radio frequency (RF) receiver system that is configured to achieve high dynamic range, comprising:
    at least one antenna;
    a plurality of receivers connected to the at least one antenna, wherein the plurality of receivers are configured to provide different gains; and
    an analog-to-digital (A/D) converter subsystem connected to the plurality of receivers, wherein the A/D converter subsystem comprises a plurality of A/D converters, wherein an overall digitization range of the A/D converter subsystem is greater than a digitization range of any of the plurality of A/D converters individually, and wherein the overall digitization range of the A/D converter subsystem is sufficiently large so as to accommodate a desired dynamic range of the RF receiver system, and wherein the plurality of receivers comprise:
    a highest gain receiver whose gain corresponds to an lower level of the desired dynamic range of the RF receiver system; and
    a lowest gain receiver whose gain corresponds to an upper level of the desired dynamic range of the RF receiver system.

17. The RF receiver system of claim 16, wherein the plurality of receivers further comprise at least one intermediate gain receiver whose gain is less than the gain provided by the highest gain receiver and is greater than the gain provided by the lowest gain receiver.

18. A radio frequency (RF) receiver system that is configured to achieve high dynamic range, comprising:
    at least one antenna;
    a plurality of receivers connected to the at least one antenna, wherein the plurality of receivers are configured to provide different gains; and
    an analog-to-digital (A/D) converter subsystem connected to the plurality of receivers, wherein the A/D converter subsystem comprises a plurality of A/D converters, wherein an overall digitization range of the A/D converter subsystem is greater than a digitization range of any of the plurality of A/D converters individually, and wherein the overall digitization range of the A/D converter subsystem is sufficiently large so as to accommodate a desired dynamic range of the RF receiver system, and further comprising a selection component that is connected to the A/D converter subsystem, wherein the selection component selects an output signal from one of the plurality of A/D converters for additional processing, wherein for each new sample of a received signal the selection component is configured to:
    select a highest gain A/D converter to be a currently selected A/D converter;

determine whether the currently selected A/D converter is saturated or near saturation;

if it is determined that the currently selected A/D converter is saturated or near saturation, select a next lowest gain A/D converter as the currently selected A/D converter and re-determine whether the currently selected A/D converter is saturated or near saturation; and if it is determined that the currently selected A/D converter is not saturated or near saturation, select the output signal from the currently selected A/D converter for additional processing.

19. A radio frequency (RF) receiver system that is configured to achieve high dynamic range, comprising:

at least one antenna;

a plurality of receivers connected to the at least one antenna, wherein the plurality of receivers are configured to provide different gains; and an analog-to-digital (A/D) converter subsystem connected to the plurality of receivers, wherein the A/D converter subsystem comprises a plurality of A/D converters, wherein an overall digitization range of the A/D converter subsystem is greater than a digitization range of any of the plurality of A/D converters individually, and wherein the overall digitization range of the A/D converter subsystem is sufficiently large so as to accommodate a desired dynamic range of the RF receiver system, and further comprising a selection component that is connected to the A/D converter subsystem, wherein the selection component selects an output signal from one of the plurality of A/D converters for additional processing, wherein for each new sample of a received signal the selection component is configured to:

select a lowest gain A/D converter to be a currently selected A/D converter;

determine whether the currently selected A/D converter is saturated or near saturation;

if the currently selected A/D converter is not saturated or near saturation, select a next highest gain A/D converter as the currently selected A/D converter and re-determine whether the currently selected A/D converter is saturated or near saturation; and if the currently selected A/D converter is saturated or near saturation, select a next lowest gain A/D converter as the currently selected A/D converter and then select the output signal from the currently selected A/D converter for additional processing.

20. A radio frequency (RF) receiver system that is configured to achieve high dynamic range, comprising:

at least one antenna;

M receivers connected to the at least one antenna, wherein the M receivers are configured to provide different gains, and wherein the different gains are selected so any signal that is within a desired dynamic range of the RF receiver system is detected by and within a linear range of at least one of the M receivers;

an analog-to-digital (A/D) converter subsystem comprising M A/D converters, wherein each of the M receivers has one of the M A/D converters connected thereto, wherein each of the M A/D converters has a digitization range that is less than the desired dynamic range of the RF receiver system, wherein an overall digitization range of the A/D converter subsystem is greater than the digitization range of any of the M A/D converters individually, wherein the overall digitization range of the A/D converter subsystem is sufficiently large so as to accommodate the desired dynamic range of the RF receiver system, wherein digitization ranges of the M A/D converters overlap, wherein the overlap of the digitization ranges is sufficient to completely contain a desired instantaneous dynamic range of the RF receiver system, and wherein the RF receiver system does not implement automatic gain control; and a selection component that is connected to the M A/D converters, wherein the selection component selects an output signal from one of the M A/D converters for additional processing.

21. A radio frequency (RF) receiver system that is configured to achieve high dynamic range, comprising:

means for receiving RF signals that are within a desired dynamic range of the RF receiver system; and means for converting any received signal that is within the desired dynamic range of the RF receiver system from an analog representation into a digital representation, wherein the RF receiver system does not implement automatic gain control, and wherein the RF receiver system does not comprise an analog-to-digital (A/D) converter that has a digitization range that is able to accommodate the desired dynamic range of the RF receiver system at a sample rate at which the RP receiver system is configured to operate.

* * * * *